J. L. BECK.
FLUSHING VALVE.
APPLICATION FILED AUG. 31, 1912. RENEWED JULY 14, 1915.
1,172,421.
Patented Feb. 22, 1916.
Fig. 1.
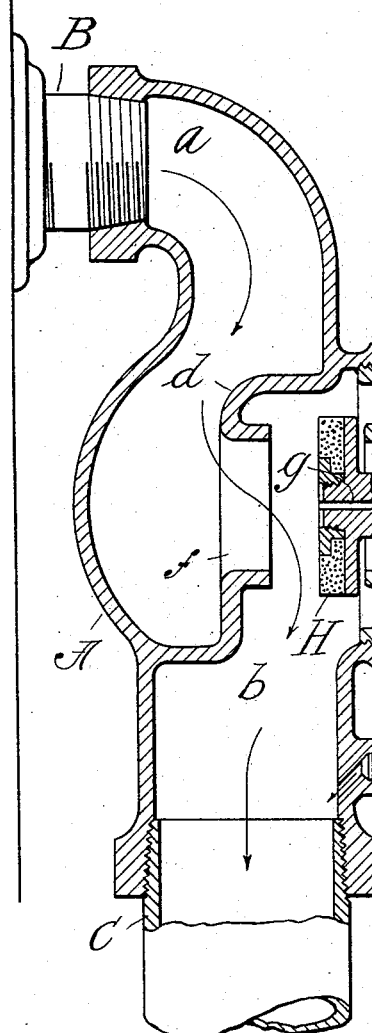
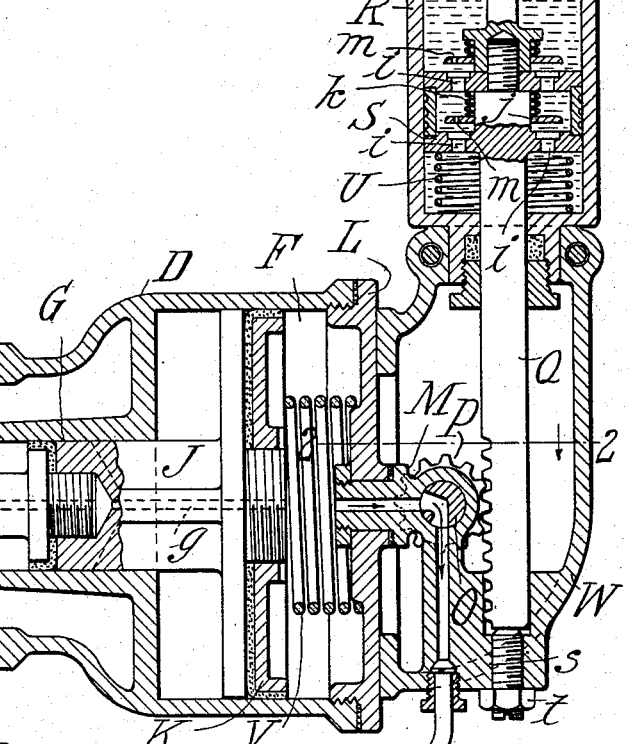
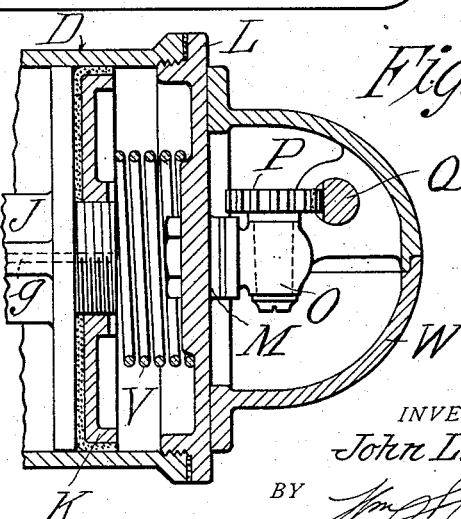
Fig. 2.
WITNESSES:
INVENTOR,
John L. Beck,
BY
ATTORNEY.

UNITED STATES PATENT OFFICE.

JOHN L. BECK, OF SPRINGFIELD, MASSACHUSETTS, ASSIGNOR, BY DIRECT AND MESNE ASSIGNMENTS, TO THE STERLING VALVE COMPANY, OF SPRINGFIELD, MASSACHUSETTS, A CORPORATION OF MASSACHUSETTS.

FLUSHING-VALVE.

1,172,421. Specification of Letters Patent. Patented Feb. 22, 1916.

Application filed August 31, 1912, Serial No. 718,048. Renewed July 14, 1915. Serial No. 39,895.

*To all whom it may concern:*

Be it known that I, JOHN L. BECK, a citizen of the United States of America, and resident of Springfield, in the county of Hampden and State of Massachusetts, have invented certain new and useful Improvements in Flushing-Valves, of which the following is a full, clear, and exact description.

This invention relates to flushing valves for water closets and analogous apparatuses of a class in which the improved appliances are connected with the water supply pipe directly and in part controlled thereby.

The object of the invention is to provide a flushing valve of comparative simplicity and cheapness of construction, and one which is entirely reliable and efficient in operation and susceptible of protracted use without derangement or the necessity for the repairing or replacement of parts.

Another object is to provide a flushing valve, all parts of which are supported one by another so that when to be used the same may be connected as a unit with the pipe for supplying water under pressure and with the pipe which leads to a water closet bowl.

The flushing valve is one characterized by the employment therein of a valve which closes a valve seat opening between the water supply or inlet and the bowl connecting outlet, and which valve is normally held in its closed position by the preponderating pressure of the water supply exerted against a piston appurtenant to the valve, which piston is of greater area than that of the valve-seat-opening,—the opening of the valve being insured by the pressure of the water supply when the aforementioned preponderating pressure is sufficiently reduced or relieved.

The invention is described in conjunction with the accompanying drawings and is set forth in the claim.

In the drawings: Figure 1 is a central vertical sectional view through the improved flushing valve. Fig. 2 is a partial horizontal section on line 2—2, Fig. 1.

Describing the flushing valve apparatus specifically as the same has been devised by me, A represents a valve body formed with inlet and outlet passages $a$, $b$, with which the pipe B for supplying water under pressure and the pipe C to be connected with the bowl are joined. The valve body is made with an internal partition $d$ separating the said passages $a$ and $b$, and having a valve-seat-opening $f$ therethrough. The said valve body has at its forward side an integrally formed hollow screw threaded hub $e$, the axis of which is coincident with that of the valve seat opening.

D represents a cylindrical casing, the rear end of which is screw threaded and shouldered for making a connection with the hollow valve body hub $e$, as shown, and this casing has a chamber F in its forward end portion of greater diameter than that of the valve seat opening $f$, and it has its rear tubular portion G of a contracted diameter.

J represents a stem slidably guided through the contracted tubular portion G of the casing, the same being provided with the valve H at its rear end for coaction with, and to normally close, the valve-seat-opening $f$, and this stem J is provided at its forward end with a piston K forming a movable wall in the cylinder chamber F. The said valve stem and piston are constructed with a contracted passage $g$ for establishing communication between the valve seat opening,—at which the pressure of the water supply is constantly present,—and the cylinder chamber F.

The cap or head L closes the forward end of the cylinder and has an opening therethrough with which a relief pipe M is connected,—the passage through said pipe being of greater diameter than the aforementioned contracted passage $g$. This pipe M, or coupled extension thereof, is continued to connection for waste with the outlet conduit leading from the valve body A; and the portion of the said pipe M which is adjacent its connection with the cylinder closing cap or head L, is formed as a body or casing for the cock or rotative valve O, for opening and closing the relief passage. On the stem or extended end of this cock O is affixed a small spur gear P with which mesh the teeth of a vertically disposed rack bar Q. This rack bar extends and is slidable through a cylindrical liquid containing casing R, the same having a closed bottom and a detachably formed closing head or cap,—such bottom and head being provided with stuffing boxes for preventing leakage through the opening in which the rack bar is movably guided.

The rack bar has a head or button h at its upper end to receive manual pressure for securing the opening operation of the valve. The intermediate portion of the rack bar is formed or equipped with a piston S closely fitting the wall of the chamber in the cylindrical casing R, said piston having a comparatively large passage i (or duplicated passages) through its thickness and having in conjunction therewith a spring pressed valve plate j which when downwardly forced by its spring k covers and substantially closes the piston passage, or passages i; but the said valve plate has a minute opening m which is adapted to register with the piston passage i.

In practice and as shown, the piston is formed with separated upper and lower walls, each having the passages i therein, and having appurtenant thereto duplicated valve plates with closing springs, each with the minute opening m,—this duplication while approved being not an absolute necessity.

U represents a spiral spring in compression under, and exerting pressure upwardly on the piston, and in effect to the rack bar.

Assuming the valve H is in its position to close the valve-seat-opening f, and the cock O is closed, the valve will be maintained in such closed position by reason of the preponderating force exerted thereon from the pressure supply through the contracted passage g in the forward portion of the cylinder chamber F.

By downward pressure on the head h of the rack bar Q whereby the latter is downwardly moved, such rack bar causes a rotative movement of the gear P and an opening of the cock O, which immediately relieves the pressure in the cylinder chamber F and leaves the pressure of the water supply effective to force the valve to the open position shown in the drawing.

On the release of the pressure downwardly on the rack bar, the same is free to be slowly elevated under the reactive force of the spring U, but only so fast as the oil, glycerin, or other liquid in the upper portion of the cylinder R may be displaced through the minute openings m in the valve plates j to the chamber in the cylinder below the valve piston. The reversed movement of the rack bar thus imparted will effect the turning of the cock O and the closing of the relief passage M, whereupon the hydraulic pressure accumulating in the cylinder chamber F,—which latter is of greater diameter than that of the valve-seat-opening,—will effect the forcing of the main valve H of the apparatus home to its closed position, and maintain it closed. The spiral spring V in the cylinder chamber between the head L and piston K is a provision of preference and not of necessity, the same accelerating the piston in the initial portion of its valve-closing movement.

The lower portion of the rack bar and the pinion provided cock O and portion of the relief pipe containing the latter are inclosed by a sectionally formed casing W through the bottom of which a screw s is adjustably applied and having combined therewith a lock nut t. The said screw serves as an adjustable abutment to limit the downward thrust of the rack bar whereby the length of time during which the valve will be open for flushing will be regulated.

It is apparent from the drawings that the valve H, its stem J and the piston are sectionally formed and screw united, as also are the rack bar and the valve provided portions of the piston in the cylinder R; and cup leathers are provided for the piston K and the stem J, all for practicability of construction and for manifest utility in the perfection of the device, these formations and provisions, however, being expedients conducing to the excellence of the equipment, but not necessarily involving invention.

I claim:

In a flushing apparatus, a casing comprising inlet and outlet passages and a valve-seat-opening connecting such passages, and a hollow cylinder the chamber of which is of greater diameter than that of the valve-seat-opening, a valve having a stem extending into the cylinder chamber and provided with a piston fitting and forming a movable wall in said chamber,—said valve, its stem and the piston having a contracted passage therethrough, forming communication between the valve seat opening and the cylinder chamber, a pressure relief passage leading from the cylinder chamber and connecting with said outlet passage having a rotative cock for opening and closing same, said cock having a gear wheel on its end, a rack bar having an engagement with said gear wheel, a spring against which said rack bar is moved in the valve opening direction, a liquid containing dash pot, constituting a retarding means against the resistance of which said spring is operable to force said rack bar in the valve closing direction, and an adjustable abutment screw for limiting the thrust of the rack bar in its cock opening movement.

Signed by me at Springfield, Mass., in presence of two subscribing witnesses.

JOHN L. BECK.

Witnesses:
 DAVID D. EVANS,
 WM. S. BELLOWS.